United States Patent
Taneja et al.

(10) Patent No.: US 10,674,440 B2
(45) Date of Patent: Jun. 2, 2020

(54) WIRELESS MAC MODE SELECTION USING MACHINE LEARNING

(71) Applicant: Cisco Technology, Inc., San Jose, CA (US)

(72) Inventors: Mukesh Taneja, Bangalore (IN); Sudhir Kumar Jain, Fremont, CA (US); Pradeep Kumar Kathail, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/044,648

(22) Filed: Jul. 25, 2018

(65) Prior Publication Data
US 2020/0037233 A1    Jan. 30, 2020

(51) Int. Cl.
| | | |
|---|---|---|
| *G06N 20/00* | (2019.01) | |
| *H04W 48/16* | (2009.01) | |
| *H04B 7/0417* | (2017.01) | |
| *H04B 7/0452* | (2017.01) | |
| *H04B 7/06* | (2006.01) | |

(52) U.S. Cl.
CPC .......... *H04W 48/16* (2013.01); *H04B 7/0417* (2013.01); *H04B 7/0452* (2013.01); *H04B 7/063* (2013.01); *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 2008/0214198 | A1* | 9/2008 | Chen | H04L 1/0026 455/450 |
| 2015/0242906 | A1* | 8/2015 | Liu | G06Q 30/0275 705/14.71 |
| 2016/0173377 | A1* | 6/2016 | Rong | H04W 74/04 370/392 |
| 2017/0230988 | A1 | 8/2017 | Zhou et al. | |

(Continued)

OTHER PUBLICATIONS

Ali, et al., "Design of MAC Layer Resource Allocation Schemes for IEEE 802.11ax: Future Directions", IETE Technical Review, 27 pages, 2016, IETE.

(Continued)

*Primary Examiner* — Chi H Pham
*Assistant Examiner* — Fahmida S Chowdhury
(74) *Attorney, Agent, or Firm* — Behmke Innovations Group LLC; James M. Behmke; James J. Wong

(57) ABSTRACT

In one embodiment, a network monitoring service trains, using a training dataset from one or more wireless networks, a machine learning model to output an optimized set of media access control (MAC) mode parameters for a wireless access point given an input set of network characteristics. The service receives a plurality of network characteristics associated with a particular wireless access point in a particular wireless network. The service determines, using the received network characteristics as input to the machine learning-based model, a set of MAC mode parameters for the particular wireless access point. The service controls the particular wireless access point to communicate with one or more clients in the particular wireless network based on the determined set of MAC mode parameters.

20 Claims, 7 Drawing Sheets

(56) References Cited

U.S. PATENT DOCUMENTS

2017/0353961 A1* 12/2017 He .................. H04W 72/082
2017/0373789 A1   12/2017 Huang et al.
2018/0357321 A1* 12/2018 Cheng ............... G06Q 30/0631

OTHER PUBLICATIONS

Bellalta, et al., "AP-initiated Multi-User Transmissions in IEEE 802.11ax WLANs", arXiv:1702.05397v1, 10 pages, Feb. 17, 2017, arXiv.org.

Bellalta, et al., "Next generation IEEE 802.11 Wireless Local Area Networks: Current status, future directions and open challenges", Computer Communications, 26 pages, 2015, Elsevier B.V.

Bellalta, Boris., "IEEE 802.11ax: High-Efficiency WLANs", arXiv:1501.01496v4, 16 pages, Jul. 28, 2015, arXiv.org.

Ma, Xiaofu., "Improving Throughput and Efficiency for WLAN: Sounding, Grouping, Scheduling", Dissertation submitted to the Faculty of the Virginia Polytechnic Institute and State University in partial fulfillment of the requirements for the degree of Doctor of Philosophy in Electrical Engineering, 145 pages, Sep. 22, 2016.

Omar, et al., "A Survey on High Efficiency Wireless Local Area Networks: Next Generation WiFi", IEEE Communications Surveys & Tutorials (vol. 18, Issue: 4, Fourthquarter 2016), pp. 2315-2344, 2016, IEEE.

Sharon, et al., "Advanced IEEE 802.11ax TCP aware scheduling under unreliable channels", arXiv:1803.10649v1, 35 pages, Mar. 27, 2018, arXiv.org.

Sharon, et al., "Scheduling Strategies and Throughput Optimization for the Downlink for IEEE 802.11ax and IEEE 802.11ac Based Networks", Wireless Sensor Network, 9, pp. 355-383, 2017, Scientific Research Publishing Inc.

* cited by examiner

WIRELESS MAC MODE SELECTION USING MACHINE LEARNING

TECHNICAL FIELD

The present disclosure relates generally to computer networks, and, more particularly, to selecting media access control (MAC) modes in a wireless network using machine learning.

BACKGROUND

Wireless networks are becoming increasingly ubiquitous, with many businesses, schools, and public areas now offering wireless connectivity to authorized users and to guests. With the increasing popularity of wireless networks, the number of different types of wireless clients is also rapidly increasing. For example, personal devices now include cellular phones, tablets, wearable devices (e.g., smart watches, head-mounted displays, etc.), and the like, of various makes, models, and configurations.

To provide better coverage to the myriad of wireless devices in a wireless network, newer wireless access points include multiple radio chains. In doing so, this allows an access point to operate in a number of different modes that support a single user (e.g., communicating with only one client at a time) or, alternatively, multiple users at the same time. From the perspective of any client of the wireless access point, the mode selected by the wireless access point can greatly influence the network performance seen by the client. However, even if the access point selects the optimal mode at one point in time, the traffic patterns in the network, the set of clients, and the like, are constantly changing, meaning that this selection may be very short lived.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
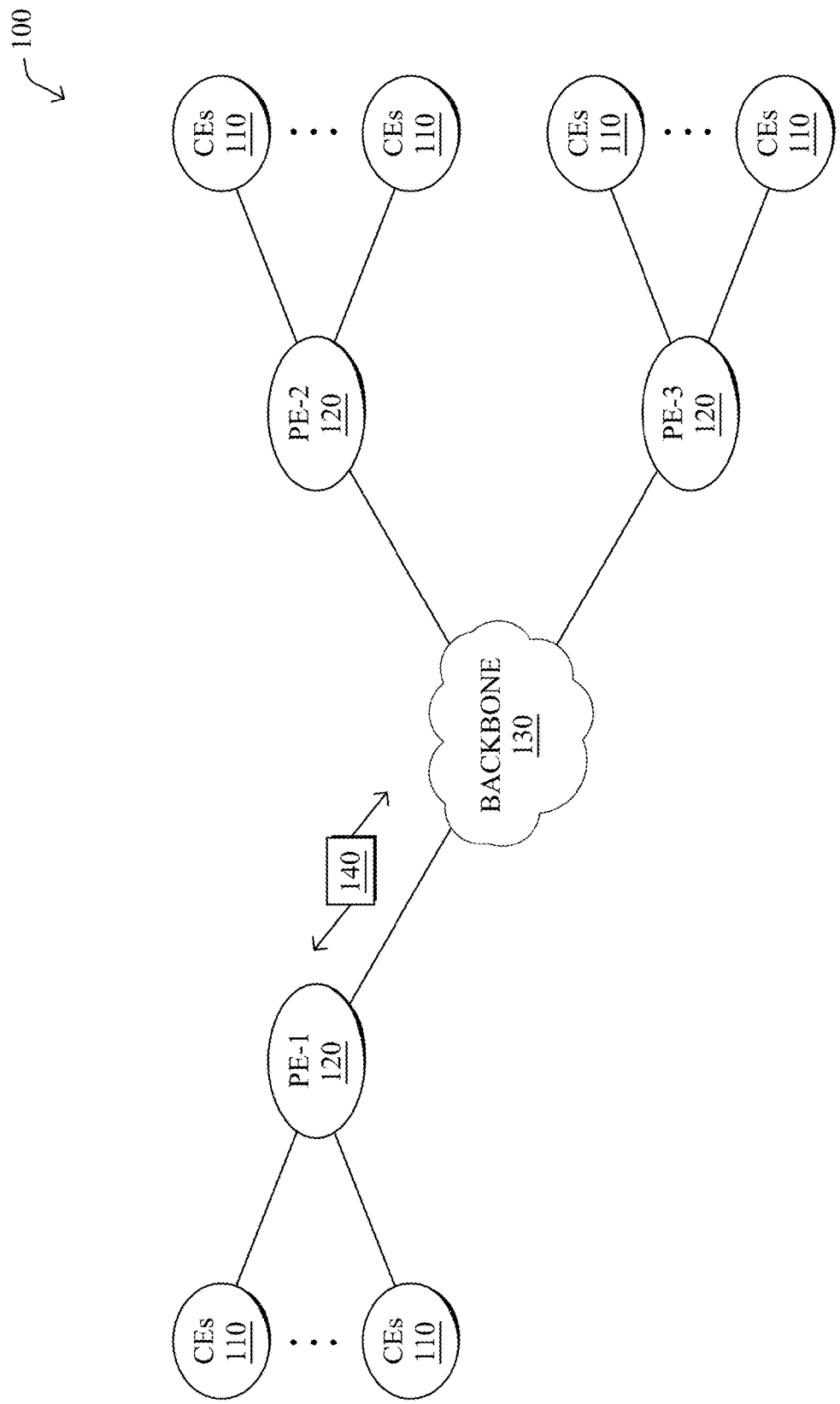
FIGS. 1A-1B illustrate an example communication network.

According to one or more embodiments of the disclosure, a network monitoring service trains, using a training dataset from one or more wireless networks, a machine learning model to output an optimized set of media access control (MAC) mode parameters for a wireless access point given an input set of network characteristics. The service receives a plurality of network characteristics associated with a particular wireless access point in a particular wireless network. The service determines, using the received network characteristics as input to the machine learning-based model, a set of MAC mode parameters for the particular wireless access point. The service controls the particular wireless access point to communicate with one or more clients in the particular wireless network based on the determined set of MAC mode parameters.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4 G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
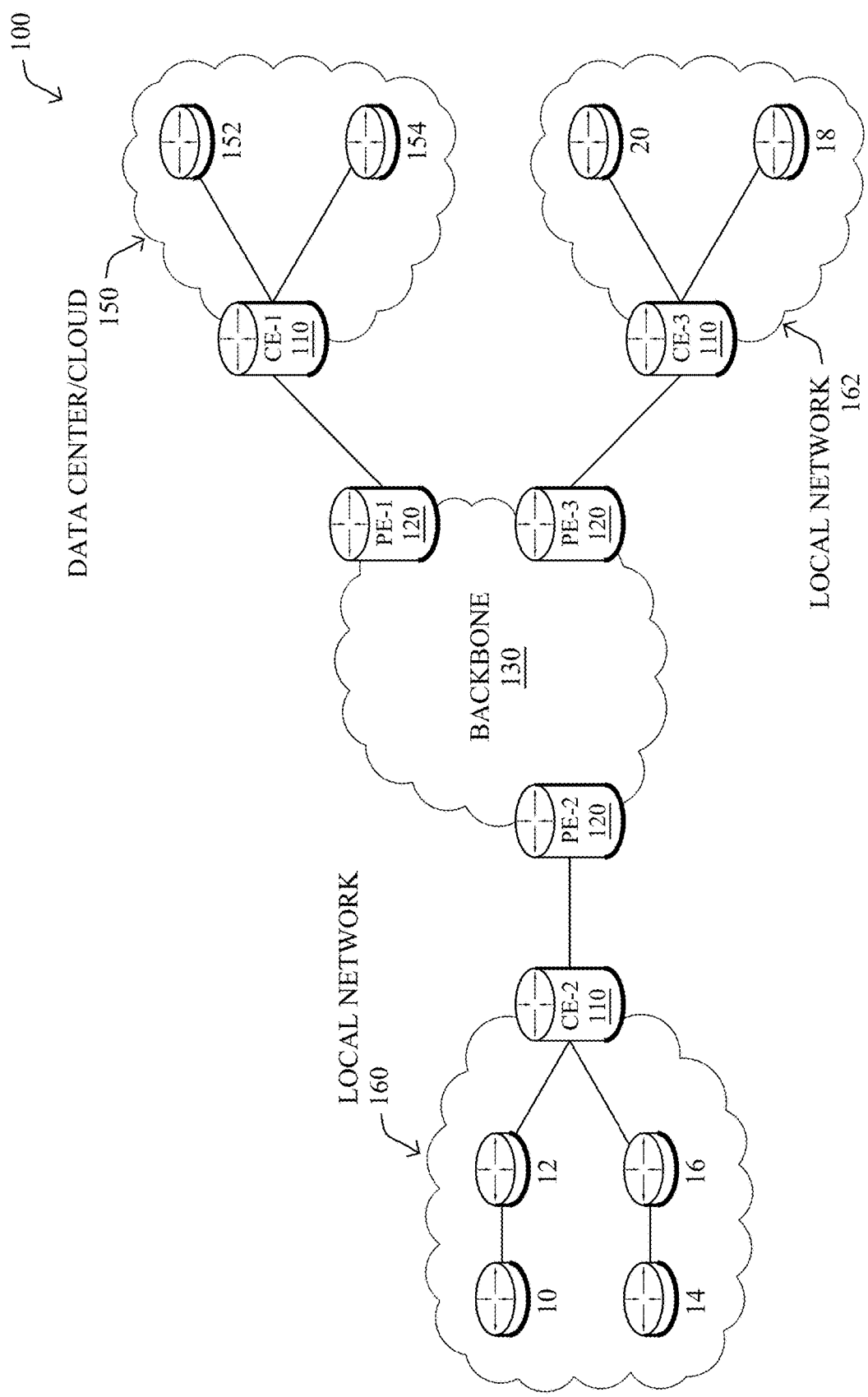

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
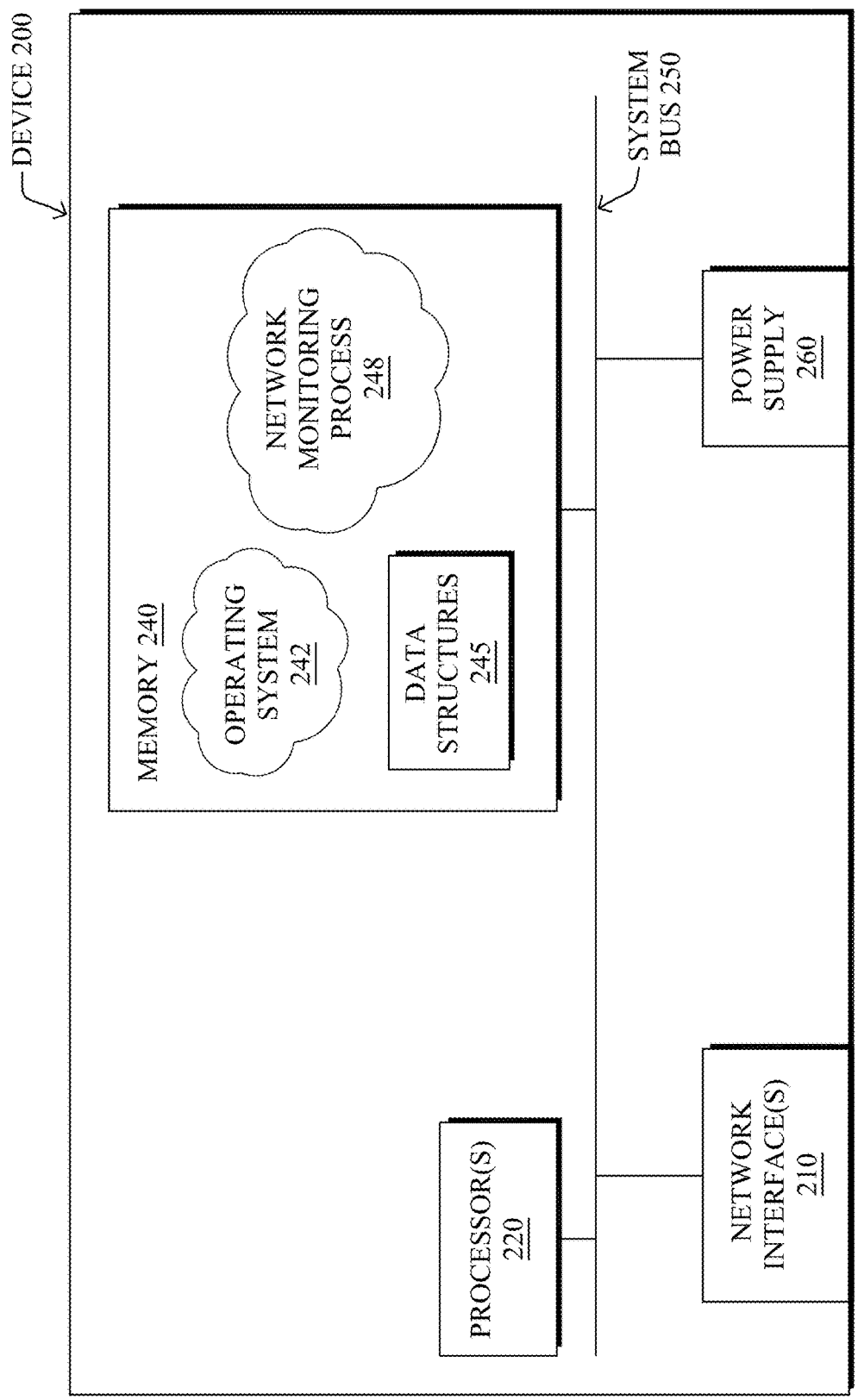
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative network monitoring process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, network monitoring process 248 may utilize machine learning techniques, to monitor, analyze, and control device behavior in a wireless network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of monitoring, analyzing, and controlling device behavior in a wireless network, a learning machine may construct a model of the observed behavior of a given client or type of client. Such a model can then be used in the wireless network to control the behavior of a device in a wireless network, such as a wireless access point (AP). Example machine learning techniques that may be used to construct such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of monitoring, analyzing, and controlling device behavior in a wireless network is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of similarity (e.g., using a Euclidian distance and a cluster based local outlier factor that takes into account the cluster density). More specifically, in some embodiments, behavioral data for clients of the same type can be clustered and used to train a behavioral model for that type of client.

Replicator techniques may also be used for purposes of monitoring, analyzing, and controlling device behavior in a wireless network. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, network monitoring process 248 may also use graph-based models for purposes of modeling and analyzing device behavior. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be used for purposes of modeling behavior in the network.

Figure 3:
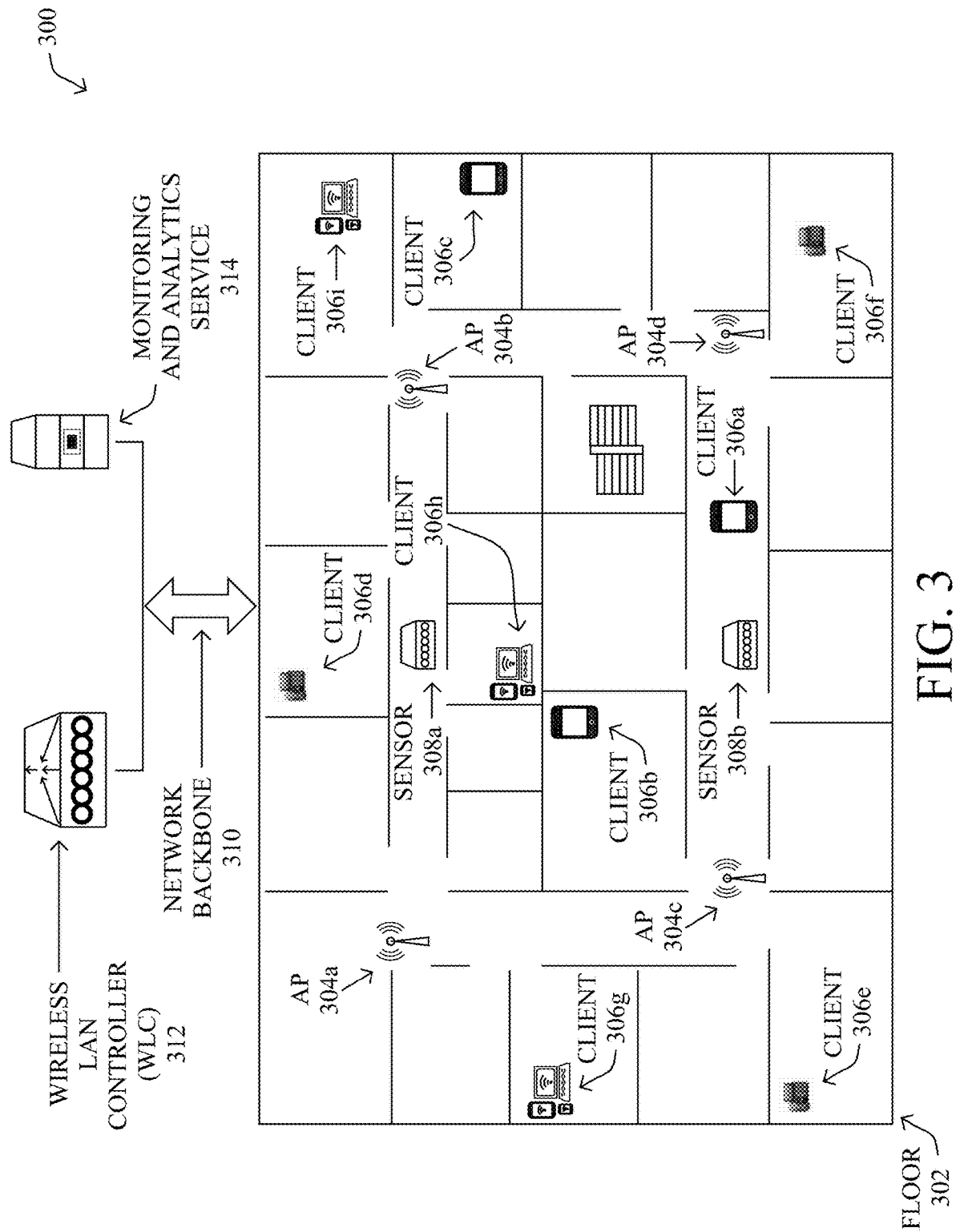
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless clients 306 distributed throughout the location. For illustrative purposes, APs 304a-304d and clients 306a-306i are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-304d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.).

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

In some embodiments, wireless network 300 may also include any number of wireless network sensors 308, such as sensors 308a-308b shown. In general, "wireless network sensors" are specialized devices that are able to act as wireless clients and perform testing on wireless network 300 and are not to be confused with other forms of sensors that may be distributed throughout a wireless network, such as motion sensors, temperature sensors, etc. In some cases, an AP 304 can also act as a wireless network sensor, by emulating a client in the network for purposes of testing communications with other APs. Thus, emulation points in network 300 may include dedicated wireless network sensors 308 and/or APs 304, if so configured.

During operation, the purpose of an emulation point in network 300 is to act as a wireless client and perform tests that include connectivity, performance, and/or negative scenarios, and report back on the network behavior to monitoring and analytics service 314. In turn, service 314 may perform analytics on the obtained performance metrics, to identify potential network issues before they are reported by actual clients. If such an issue is identified, service 314 can then take corrective measures, such as changing the operation of network 300 and/or reporting the potential issue to a network administrator or technician.

The types and configurations of clients 306 in network 300 can vary greatly. For example, clients 306a-306c may be mobile phones, clients 306d-306f may be office phones, and clients 306g-306i may be computers, all of which may be of different makes, models, and/or configurations (e.g., firmware or software versions, chipsets, etc.). Consequently, each of clients 306a-306i may behave very differently in wireless network 300 from both RF and traffic perspectives.

As noted above, a wireless network may include any number of different devices and, correspondingly, the APs in the network may service these devices using any number of different MAC modes. For example, 802.11ax systems support multi-user (MU) capabilities using orthogonal frequency-division multiple access (OFDMA) and download/upload (DL/UL) multi-user multiple input and multiple output (MU-MIMO). As would be appreciated, an 802.11ax network is a half-duplex (HD) system. However, work is progressing towards development of full-duplex (FD) support. With that, next generation APs will support even more MAC modes. For example, an AP in the future may support full duplex DL/UL OFDMA whereby an AP could decide to allow DL as well as UL data transmission in the same resource unit (RU).

Currently, an AP has to select a suitable working mode (e.g., SU or HD OFDMA or HD MU-MIMO or FD OFDMA) and allocate resources (e.g., RUs, spatial streams, transmit power, etc.) for that working mode. There are tens of thousands of patterns to consider and a good one needs to be chosen each time, with each "pattern" including both the MAC mode and the resource allocations within the modes. These chosen patterns eventually impact aggregate performance of the network and network clients.

MAC mode and resource allocation selection may need to be taken every few millisecond and it is computationally impossible for an AP to consider all these patterns and select an optimum one. An AP would typically run a heuristic method and look to select a good pattern, which can vary depending on the available chipset and selection algorithm used to select the MAC mode and resource allocation. For example, the following combinations are but a few potential configurations:

Beyond-11ax (and 11ax) APs with chipsets from vendor A or B or C+ algorithms supplied by the same or a different chipset vendor Beyond-11ax (and 11ax) APs with chipsets from vendor A or B or C+algorithms supplied by AP manufacturer Beyond-11ax (and 11ax) APs with chipset supplied by AP manufacturer, chipset vendor A (or B or C) and algorithms supplied by one of these Each of above combinations (of chipset supplier and algorithm provider) typically results in different performance from the viewpoint of the AP, its client(s), as well as the applications in use. This is due to the following:

Mode selection and resource allocation are combinatorial optimization problems.

Selection algorithms tend to achieve different fairness objectives and, thus, solutions and associated performance indicators differ between vendors.

The complexity of the selection algorithm is also dependent on the hardware and software architecture from the vendor. For instance, some vendors provide (hardware) accelerators for some specific algorithmic operations, which allow an AP to run a more sophisticated selection algorithm.

In addition to the above, patterns and user behavior also evolve over time. From the above, this means that any given AP may have difficulty in selecting the best MAC mode, due to its inability to quickly adapt to the changing conditions.

Wireless MAC Mode Selection Using Machine Learning

The techniques herein introduce a MAC mode selection mechanism for next-generation APs. In some aspects, the techniques herein provide for a machine learning-based model to be trained using network characteristics from any number of wireless networks. In turn, the model can be used to suggest MAC mode parameters for a given AP, in view of its own associated characteristics.

Specifically, according to one or more embodiments of the disclosure as described in detail below, a network monitoring service trains, using a training dataset from one or more wireless networks, a machine learning model to output an optimized set of media access control (MAC) mode parameters for a wireless access point given an input set of network characteristics. The service receives a plurality of network characteristics associated with a particular wireless access point in a particular wireless network. The service determines, using the received network characteristics as input to the machine learning-based model, a set of MAC mode parameters for the particular wireless access point. The service controls the particular wireless access point to communicate with one or more clients in the particular wireless network based on the determined set of MAC mode parameters.

Illustratively, the techniques described herein may be performed by hardware, software, and/or firmware, such as in accordance with the network monitoring process 248, which may include computer executable instructions executed by the processor 220 (or independent processor of interfaces 210) to perform functions relating to the techniques described herein.

Figure 4:
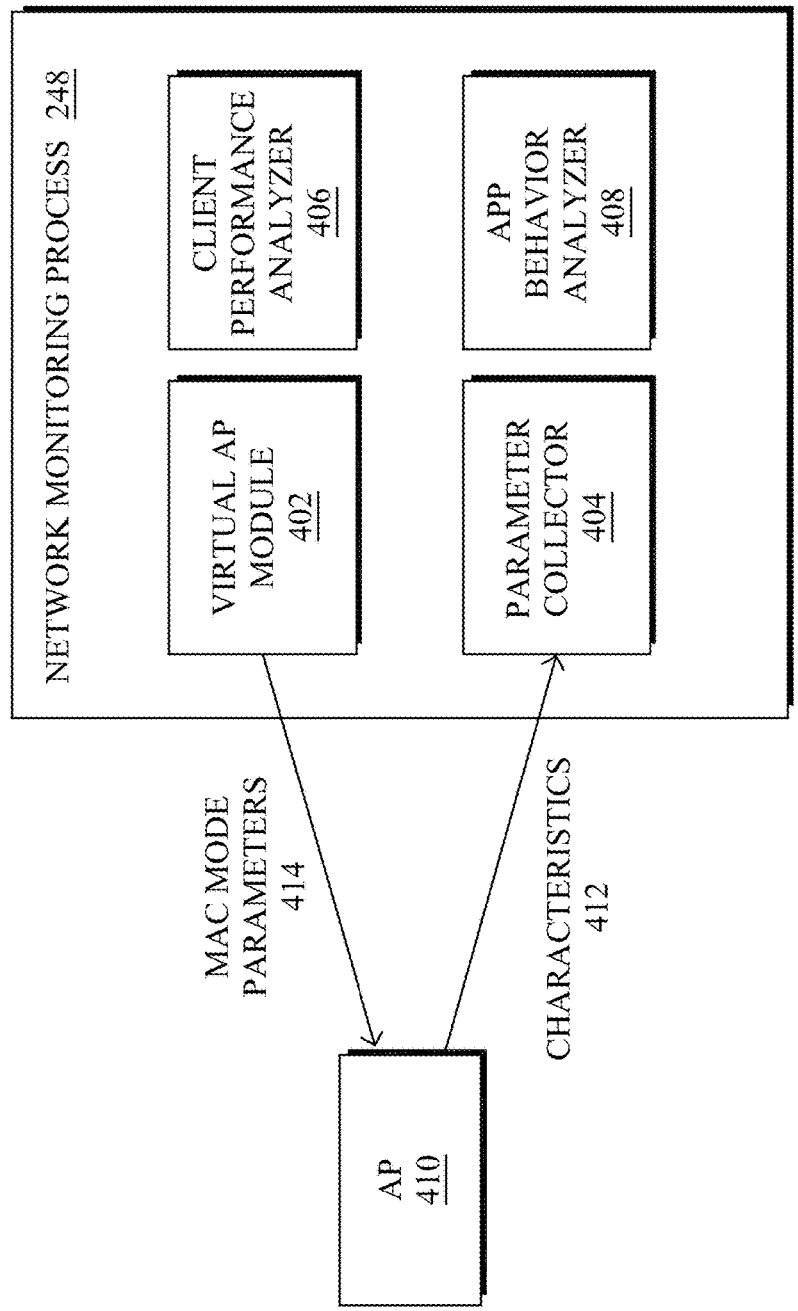
FIG. 4 illustrates an example architecture for controlling a wireless access point.

Operationally, FIG. 4 illustrates an example architecture 400 for controlling a wireless access point, according to various embodiments. As shown, network monitoring process 248 may include various components/sub-processes 402-408, to provide a monitoring service to a wireless network that includes AP 410. As would be appreciated, the components of architecture 400 may be implemented in a distributed manner across any number of devices or, alternatively, by a single analysis device. In addition, the functionalities of the components of architecture 400 may be combined, omitted, or implemented as part of other processes, as desired. For example, the monitoring service may be executed on AP 410 itself and rely on AP-AP communications. In another example, the monitoring service can be executed on a specific AP or WLAN (or AP) controller, to function as the "lead" in a given area. In a further example, the service can be implemented as a cloud-based service that communicates with any number of monitored wireless networks.

During operation, AP 410 may support a variety of MAC modes, to communicate with the client device(s) attached to AP 410 in the target network. These modes give rise to a number of MAC mode parameters that may be used to control the functioning of AP 410. For example, Table 1 below lists a set of potential MAC modes and MAC mode parameters for a certain time interval (t1, t2):

TABLE 1

| MAC Mode | Parameters for Time Period (t1, t2) |
| --- | --- |
| Single User (SU) mode | num-su(t) = number of times SU mode used during (t1, t2)<br>frac-su(t1, t2) = fraction of time SU mode used during (t1, t2) |
| DL OFDMA (MU) | num-ofdma-dl(t1, t2) = number of times DL OFDMA mode used during (t1, t2)<br>frac-ofdma-dl(t1, t2) = fraction of time DL OFDMA mode used during (t1, t2) |
| UL OFDMA (MU) | num-ofdma-ul(t1, t2) = number of times UL OFDMA mode used during (t1, t2)<br>frac-ofdma-ul(t1, t2) = fraction of time UL OFDMA mode used during (t1, t2) |
| DL MU-MIMO | num-mu-mimo-dl(t1, t2) = number of times DL MU-MIMO mode used during (t1, t2)<br>frac-mu-mimo-dl(t1, t2) = fraction of time DL MU-MIMO mode used during (t1, t2) |
| UL MU-MIMO | num-mu-mimo-ul(t1, t2) = number of times UL MU-MIMO mode used during (t1, t2)<br>frac-mu-mimo-ul(t1, t2) = fraction of time UL MU-MIMO mode used during (t1, t2) |
| Hybrid OFDMA and MU-MIMO for DL | num-hybrid-dl(t1, t2) = number of times hybrid OFDMA and MU-MIMO mode used during (t1, t2) for DL<br>frac-hybrid-dl(t1, t2) = fraction of time hybrid mode used during (t1, t2) for DL |
| Hybrid OFDMA and MU-MIMO for UL | num-hybrid-ul(t1, t2) = number of times hybrid mode used during (t1, t2) for UL<br>frac-hybrid-ul(t1, t2) = fraction of time hybrid mode used during (t1, t2) for UL |
| Full-duplex | num-fd(t1, t2): number of times full-duplex mode used during (t1, t2)<br>frac-fd(t1, t2): fraction of time FD mode used during (t1, t2)<br>num-sta-fd(t1, t2): number of STAs for which FD mode used during (t1, t2)<br>frac-rus-fd(t1, t2): fraction of sub-carriers or RUs for which FD mode is used during (t1, t2) |

Figure 5:
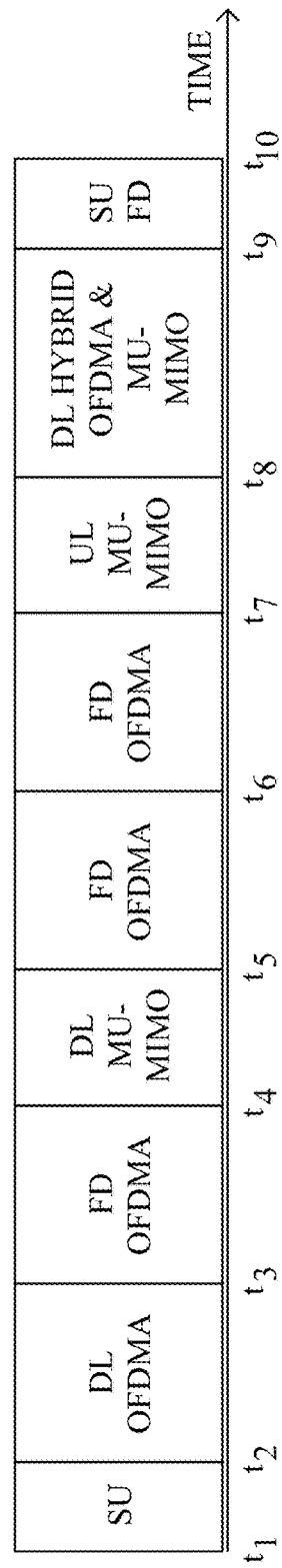
FIG. 5 illustrates an example sequence of wireless access point modes.

According to various embodiments, network monitoring process 248 may include a virtual AP module 402 that leverages machine learning, to select the appropriate MAC mode parameters for AP 410 and to control AP 410 based on the selected parameters. For example, FIG. 5 illustrates an example sequence 500 of wireless access point MAC modes that can be used by AP 410 over the course of a time period ($t_1$, $t_{10}$). Notably, during a first portion of the time interval (e.g., from $t_1$ to $t_2$), AP 410 may use its SU mode to communicate with a single client device, then switch to using its DL OFDMA mode (e.g., from $t_2$ to $t_3$), followed by switching to using its FD OFDMA mode (e.g., from $t_3$ to $t_4$), etc. Thus, for any given time period, network monitoring process 248 may collect and determine the parameters shown above in Table 1 and/or may control a given AP, such as AP 410, to communicate with its attached client(s) according to parameter values determined by network monitoring process 248.

As shown in FIG. 4, network monitoring process 248 may include a parameter collector 404 that collects network characteristics 412 associated with an AP (e.g., AP 410) that can be used as input to the machine learning model of virtual AP module 402 and/or for purposes of training the model of virtual AP module 402. In various embodiments, parameter collector 404 may collect, for each time period (tj, tk) and from any number of APs monitored by process 248, any of the MAC mode parameters in Table 1 above. Notably, parameter collector 404 may collect the following MAC mode parameters for (tj, tk):

Chosen MAC mode (SU, DL OFDMA, UL MU-MIMO, Hybrid DL OFDMA and MU-MIMO, Full-Duplex, etc.)

Number and fraction of time(s) a given MAC mode is selected during (tj,tk)

Some other mode specific parameters, such as number of users served using full-duplex mode during (tj,tk), fraction of sub-carriers (or RU capacity) for which full-duplex mode is used during (tj,tk), etc.

In various embodiments, virtual AP module 402 may divide users/clients of a given AP by zone, depending on their location. For example, virtual AP module 402 may divide the clients of an AP into three zones, with clients in zone $z\_1$ being very close to the AP, clients in zone $z\_2$ at a moderate distance to the AP, and the remaining clients in zone $z\_3$ being the farthest from the AP.

Another set of network characteristics that parameter collector 404 may collect relate to the access class of an application. More specifically, parameter collector 404 may collect data regarding the types of applications being supported by each client of an AP. This can be captured by looking at the access class in which data is sent to or from the client. For example, four access classes (e.g., $c\_1$, $c\_2$, $c\_3$, and $c\_4$) are often supported in many standards and products. IP DSCP can also be used along with the access class, as well as information regarding the minimum and maximum number of users sending DL or UL traffic for a specific access class during a time interval (e.g., Nmin, Nmax). In further cases, if available, the weighted average channel conditions of clients can also be collected. By way of example, further network characteristics that parameter collector 404 may collect and use as input to virtual AP module 402 and/or to train the model of virtual AP module 402 are shown in Table 2 below:

TABLE 2

| Feature | Explanation | Source |
|---|---|---|
| Nmin(APx; z_j, c_m, DL)(t1, t2) | Minimum number of stations in zone z_j for APx which are sending traffic in downlink direction corresponding to Access Class c_m during (t1, t2) | Can be counted at AP for DL traffic |
| Nmax(APx; z_j, c_m, DL)(t1, t2) | Maximum number of stations in zone z_j for APx which are sending traffic in downlink direction corresponding to Access Class c_m during (t1, t2) | |
| Nmin(APx; z_j, c_m, UL)(t1, t2) | Minimum number of stations in zone z_j for APx which are sending traffic in uplink direction corresponding to Access Class c_m during (t1, t2) | Can be counted at AP for UL traffic (or can be communicated by stations to AP via vendor specific objects) |
| Nmax(APx; z_j, c_m, UL)(t1, t2) | Maximum number of stations in zone z_j for APx which are sending traffic in uplink direction corresponding to Access Class c_m during (t1, t2) | |

In further embodiments, parameter collector 404 may also gather network performance and/or client performance information for use by virtual AP module 402. For example, this may include any or all of the following performance-related metrics:

TABLE 3

| Feature | Explanation | Source |
|---|---|---|
| dataRate(APx; z_j, c_m, DL) (t1, t2) | Aggregate data rate for stations belonging to zone z_j, class c_m, for DL traffic, measured during (t1, t2) for AP x | Can be measured at AP for DL traffic |
| dataRate(APx; z_j, c_m, UL) (t1, t2) | Aggregate data rate for stations belonging to zone z_j, class c_m, for UL traffic, measured during (t1, t2) for AP x | Can be measured at AP for UL traffic |
| worstLatency(APx; z_j, c_m, DL)(t1, t2), only for ACs that carry delay sensitive traffic | Worst case latency of any packet for delay sensitive access class c_m, considering stations of zone z_j, for DL traffic during (t1, t2) for AP x | Can be measure at AP for DL traffic. |

TABLE 3-continued

| Feature | Explanation | Source |
|---|---|---|
| worstLatency (APx; z_j, c_m, UL)(t1, t2), only for ACs that carry delay sensitive traffic | Worst case latency of any packet for delay sensitive access class c_m, considering stations of zone z_j, for UL traffic during (t1, t2) for AP x | Measured at stations and communicated to AP via vendor specific objects. Use of this field can be optional |
| worstJitter(APx; z_j, c_m, DL)(t1, t2), only for ACs that carry delay sensitive traffic | Worst case delay jitter of any packet for delay sensitive access class c m, considering stations of zone z_j, for DL traffic during (t1, t2) for AP x | Can be measure at AP for DL traffic. |
| worstJitter(APx; z_j, c_m, UL)(t1, t2), only for ACs that carry delay sensitive traffic | Worst case delay jitter of any packet for delay sensitive access class c_m, considering stations of zone z_j, for UL traffic during (t1, t2) for AP x | Measured at stations and communicated to AP via vendor specific objects. Use of this field can be optional |
| dataRate(APx; z_j, c_m, DL) (t1, t2) | Aggregate data rate for stations belonging to zone z_j, class c_m, for DL traffic, measured during (t1, t2) for AP x | Can be measured at AP for DL traffic |

For the worst case delay-related or jitter-related features above, these should be measured for the IP packets. However, if that is not possible in the wireless network, these metrics can also be measured from the MAC packets. Optionally, other performance-related characteristics that can be collected may also include average delay (e.g., for access classes associated with applications that need lower average delays) and/or packet loss (e.g., for applications where reliability is critical). Note that per-application features can also be captured instead of per-access class features, in some embodiments.

Yet further features that parameter collector 404 may collect for use by virtual AP module 402 may include any or all of the following:

Per-access-class aggregate throughput supported by AP for DL traffic during (tj,tk)

Per-access-class aggregate throughput supported by AP for UL traffic during (tj,tk)

WLAN technologies supported by different devices (802.11a/b/g/n/ac/ax, FD, etc.)

Channel condition measure for each station if available (optional)

Application mix (such as number and types of different apps—video, VoIP, web browsing, etc.) supported by AP, etc.

Virtual AP module 402 uses the above information (e.g., MAC mode parameters, scenario specific parameters and performance data for AP, users and apps, etc.) and uses machine learning to model what an AP should do to achieve good performance in each of these scenarios. Example machine learning approaches that are particularly suitable for this task include support vector machines (SVMs) and service vector regression (SVR). and learns (using ML techniques such as SVM/SVR) what a good AP should do to achieve good performance in each of these scenarios.

As each AP gets MAC mode parameters as feedback from virtual AP module 402, it uses that to adapt its resource allocation strategies. For example, MAC mode parameters 414 sent to AP 410 could indicate that AP 410 should use SU mode for x % of time, MU OFDMA mode for y % of time, MU-MIMO mode for z % time, and hybrid OFDMA/MU- MIMO mode for z % of time in a given time period, for a given type of scenario, for improved performance. AP 410 can use this to adapt its mode selection strategies and provide suitable weightage to different methods as suggested by virtual AP module 402.

According to various embodiments, network monitoring process 248 may also include a client performance analyzer 406 and/or an app behavior analyzer 408. These modules may operate in conjunction with virtual AP module 402 or may be implemented as part of virtual AP module 402, directly. Parameter collector 404 may provide the collected network characteristics to client performance analyzer 406 and app behavior analyzer 408 for analysis.

Client performance analyzer 406 may be configured to perform root cause analysis obtained for a basis service set (BSS) and identifies clients/users that are not getting good performance. For example, client performance analyzer 406 may identify clients that are getting higher latencies (than needed) for their delay sensitive applications. Next, client performance analyzer 406 may identify possible causes for the lack of acceptable performance. For example, it could identify one or more of the following as reasons for higher latencies:
Density of clients
Location of clients
Poor channel conditions
Interference from other devices
Presence of legacy clients
Indication from virtual AP module 402 that the MAC mode selection strategies of an AP need to improve App behavior analyzer 408 may similarly analyze the behavior of the different applications executed by the clients of an AP. For example, analyzer 408 may analyze behavioral parameters such as sleep/wake schedules of devices and their traffic patterns. Notably, many IoT devices conserve power by only powering up periodically to transmit sensor data. By having app behavior analyzer 408 learn these periodic behaviors, virtual AP module 402 can incorporate these behaviors into its model, thereby selecting MAC mode parameters that take these behaviors into account.

Figure 6:
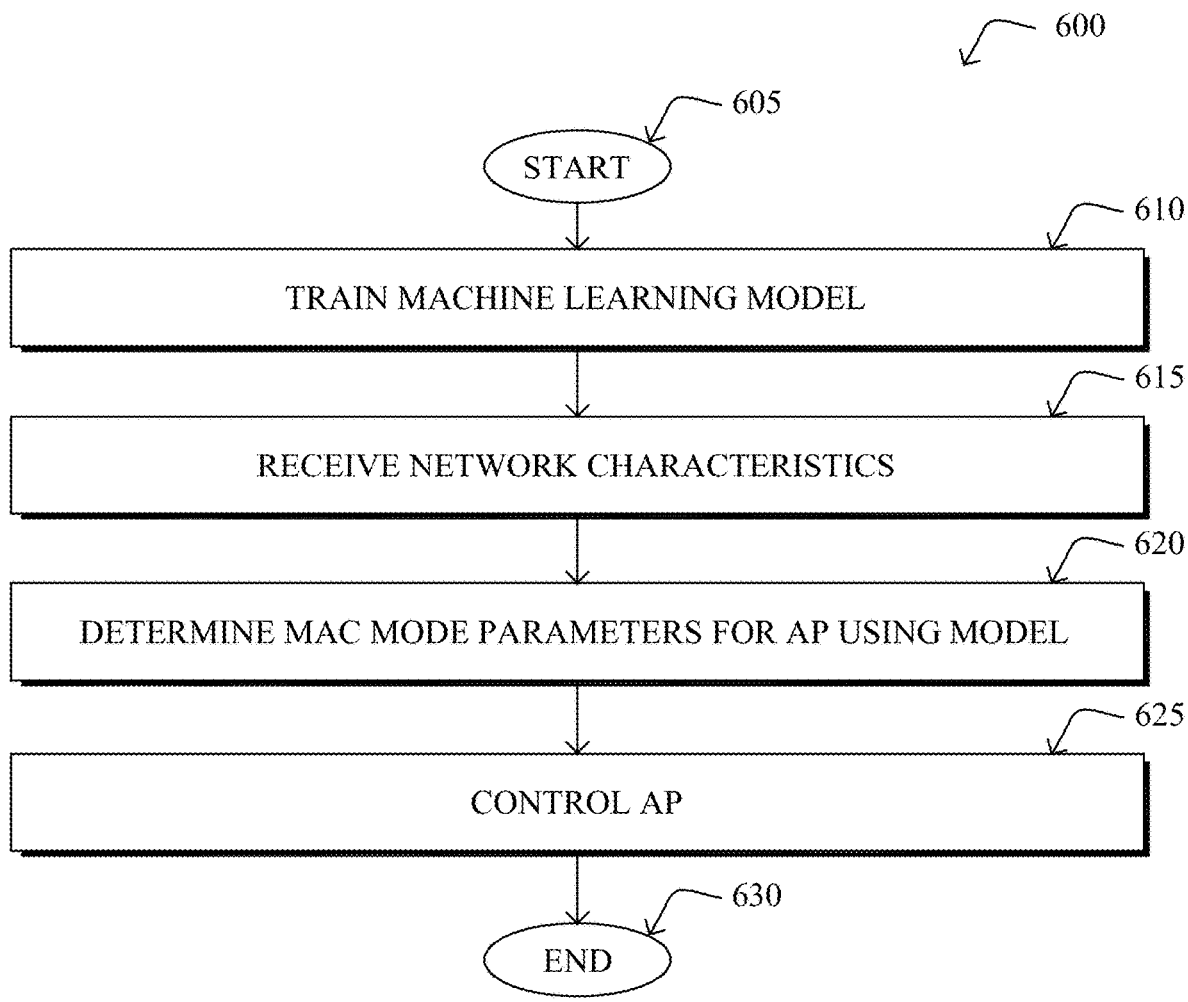
FIG. 6 illustrates an example simplified procedure for controlling a wireless access point.

FIG. 6 illustrates an example simplified procedure for controlling a wireless access point in accordance with one or more embodiments described herein. For example, a non-generic, specifically configured device (e.g., device 200) may perform procedure 400 by executing stored instructions (e.g., process 248). The procedure 600 may start at step 605, and continues to step 610, where, as described in greater detail above, a network monitoring service may train, using a training dataset from one or more wireless networks, a machine learning model to output an optimized set of media access control (MAC) mode parameters for a wireless access point given an input set of network characteristics. For example, the service may train an SVM or SVR model based on the network characteristics associated with the APs and the corresponding MAC mode parameters that were used by the APs.

At step 615, as detailed above, the network monitoring service may receive a plurality of network characteristics associated with a particular wireless AP in a particular wireless network. Such characteristics may include, but are not limited to, data regarding the MAC mode(s) used by the AP, the clients of the AP and their locations relative to the AP, the application(s) used by the clients of the AP, network metrics (e.g., delay, packet loss, jitter, etc.), combinations thereof, or any other information regarding the behavior of the AP, the network, or AP clients.

At step 620, the network monitoring service may determine, using the received network characteristics as input to the machine learning-based model, a set of MAC mode parameters for the particular wireless access point, as described in greater detail above. Notably, the model may determine the MAC mode parameters that are best suited for the scenario experienced by the particular AP, such as its number of clients, serviced applications, and the like.

At step 625, as detailed above, the network monitoring service may control the particular wireless access point to communicate with one or more clients in the particular wireless network based on the determined set of MAC mode parameters. For example, the service may instruct the particular AP to use any of the following MAC modes, as well as when and how: a SU mode, a DL or UL MU-MIMO mode, a DL or UL OFDMA mode, a DL or UL hybrid MU-MIMO and OFDMA mode, or a full-duplex mode. In some cases, the service may specify the percentage of a given time period that the AP should use each of the MAC modes selected by the network monitoring service. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for wireless MAC mode selection using machine learning, it is to be understood that various other adaptations and modifications may be made within the spirit and scope of the embodiments herein. For example, while certain embodiments are described herein with respect to using certain models for purposes of MAC mode parameter selection, the models are not limited as such and may be used for other functions, in other embodiments. In addition, while certain protocols are shown, such as 802.11, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
training, by a network monitoring service and using a training dataset from one or more wireless networks, a machine learning model to output an optimized set of media access control (MAC) mode parameters for a wireless access point given an input set of network characteristics wherein the machine learning model is a behavioral model that is indicative of sleep/wake schedules or traffic patterns of clients of the one or more wireless networks;

receiving, at the service, a plurality of network characteristics associated with a particular wireless access point in a particular wireless network;
determining, by the service and using the received network characteristics as input to the machine learning model, a set of MAC mode parameters for the particular wireless access point; and
controlling, by the service, the particular wireless access point to communicate with one or more clients in the particular wireless network based on the determined set of MAC mode parameters.

2. The method as in claim 1, wherein the determined MAC mode parameters comprise parameters for one or more of: a single user (SU) mode, a downlink (DL) or uplink (UL) multi-user multiple input and multiple output (MU-MIMO) mode, a DL or UL orthogonal frequency-division multiple access (OFDMA) mode, a DL or UL hybrid MU-MIMO and OFDMA mode, or a full-duplex mode.

3. The method as in claim 1, wherein the network characteristics associated with the particular wireless access point comprise at least one sleep/wake schedule for a client device attached to the particular wireless access point.

4. The method as in claim 1, wherein the determined MAC mode parameters specify a number of client devices to be served by the particular wireless access point during a period of time.

5. The method as in claim 1, further comprising:
dividing, by the service, the received network characteristics associated with the wireless access point based in part on client distances to the particular wireless access point.

6. The method as in claim 1, wherein the network characteristics associated with the particular wireless access point comprise client application-specific metrics.

7. The method as in claim 1, wherein the network characteristics associated with the particular wireless access point comprise delay, jitter, or packet loss metrics.

8. The method as in claim 1, wherein the training dataset is from one or more wireless networks that differ from the particular wireless network, and wherein the network monitoring service is a cloud-based service.

9. The method as in claim 1, wherein the network monitoring service is hosted by a wireless access point or wireless access point controller in the particular network.

10. An apparatus comprising:
one or more network interfaces to communicate with a network;
a processor coupled to the network interfaces and configured to execute one or more processes; and
a memory configured to store a process executable by the processor, the process when executed configured to:
train, using a training dataset from one or more wireless networks, a machine learning model to output an optimized set of media access control (MAC) mode parameters for a wireless access point given an input set of network characteristics wherein the machine learning model is a behavioral model that is indicative of sleep/wake schedules or traffic patterns of clients of the one or more wireless networks;
receive a plurality of network characteristics associated with a particular wireless access point in a particular wireless network;
determine, using the received network characteristics as input to the machine learning model, a set of MAC mode parameters for the particular wireless access point; and
control the particular wireless access point to communicate with one or more clients in the particular wireless network based on the determined set of MAC mode parameters.

11. The apparatus as in claim 10, wherein the determined MAC mode parameters comprise parameters for one or more of: a single user (SU) mode, a downlink (DL) or uplink (UL) multi-user multiple input and multiple output (MU-MIMO) mode, a DL or UL orthogonal frequency-division multiple access (OFDMA) mode, a DL or UL hybrid MU-MIMO and OFDMA mode, or a full-duplex mode.

12. The apparatus as in claim 10, wherein the network characteristics associated with the particular wireless access point comprise at least one sleep/wake schedule for a client device attached to the particular wireless access point.

13. The apparatus as in claim 10, wherein the determined MAC mode parameters specify a number of client devices to be served by the particular wireless access point during a period of time.

14. The apparatus as in claim 10, wherein the process when executed is further configured to:
divide the received network characteristics associated with the wireless access point based in part on client distances to the particular wireless access point.

15. The apparatus as in claim 10, wherein the network characteristics associated with the particular wireless access point comprise client application-specific metrics.

16. The apparatus as in claim 10, wherein the network characteristics associated with the particular wireless access point comprise delay, jitter, or packet loss metrics.

17. The apparatus as in claim 10, wherein the training dataset is from one or more wireless networks that differ from the particular wireless network, and wherein the apparatus provides a cloud-based service.

18. The apparatus as in claim 10, wherein the apparatus comprises a wireless access point or wireless access point controller in the particular network.

19. A tangible, non-transitory, computer-readable medium storing program instructions that cause a service to execute a process comprising:
training, by the service and using a training dataset from one or more wireless networks, a machine learning model to output an optimized set of media access control (MAC) mode parameters for a wireless access point given an input set of network characteristics, wherein the machine learning model is a behavioral model that is indicative of sleep/wake schedules or traffic patterns of clients of the one or more wireless networks;
receiving, at the service, a plurality of network characteristics associated with a particular wireless access point in a particular wireless network;
determining, by the service and using the received network characteristics as input to the machine learning model, a set of MAC mode parameters for the particular wireless access point; and
controlling, by the service, the particular wireless access point to communicate with one or more clients in the particular wireless network based on the determined set of MAC mode parameters.

20. The computer-readable medium as in claim 19, wherein the determined MAC mode parameters comprise parameters for one or more of: a single user (SU) mode, a downlink (DL) or uplink (UL) multi-user multiple input and multiple output (MU-MIMO) mode, a DL or UL orthogonal frequency-division multiple access (OFDMA) mode, a DL or UL hybrid MU-MIMO and OFDMA mode, or a full-duplex mode.

\* \* \* \* \*

UNITED STATES PATENT AND TRADEMARK OFFICE
CERTIFICATE OF CORRECTION

PATENT NO. : 10,674,440 B2
APPLICATION NO. : 16/044648
DATED : June 2, 2020
INVENTOR(S) : Mukesh Taneja Page 1 of 1

It is certified that error appears in the above-identified patent and that said Letters Patent is hereby corrected as shown below:

In the Specification

Column 12, Table 3, in the Explanation Column, Line 12, should read:
sensitive access class c_m In the Claims Column 14, Line 58, Claim 1 should read:
1. A method, comprising:

Column 14, Line 58, Claim 1 should read:
characteristics, wherein the machine learning model is a Column 15, Line 57, Claim 10 should read:
set of network characteristics, wherein the machine Signed and Sealed this
Twenty-second Day of September, 2020

Andrei Iancu
*Director of the United States Patent and Trademark Office*